US009532354B2

(12) United States Patent
Gidlund et al.

(10) Patent No.: US 9,532,354 B2
(45) Date of Patent: Dec. 27, 2016

(54) CONTENTION BASED ACCESS OF RESOURCES IN A WIRELESS NETWORK

(71) Applicant: ABB Research Ltd., Zurich (CH)

(72) Inventors: Mikael Gidlund, Sundsvall (SE); Johan Akerberg, Vasteras (SE)

(73) Assignee: ABB Research Ltd., Zurich (CH)

( * ) Notice: Subject to any disclaimer, the term of this patent is extended or adjusted under 35 U.S.C. 154(b) by 119 days.

(21) Appl. No.: 14/106,121

(22) Filed: Dec. 13, 2013

(65) Prior Publication Data

US 2014/0098801 A1 Apr. 10, 2014

Related U.S. Application Data

(63) Continuation of application No. PCT/EP2011/060149, filed on Jun. 17, 2011.

(51) Int. Cl.
*H04W 72/04* (2009.01)
*H04W 74/08* (2009.01)

(52) U.S. Cl.
CPC ..... *H04W 72/0446* (2013.01); *H04W 74/0841* (2013.01); *H04W 74/0875* (2013.01)

(58) Field of Classification Search
CPC ... H04W 28/24; H04W 56/00; H04W 72/1236
See application file for complete search history.

(56) References Cited

U.S. PATENT DOCUMENTS

| 6,169,744 B1* | 1/2001 | Grabelsky et al. ........... 370/447 |
| 2003/0033394 A1 | 2/2003 | Stine |
| 2009/0227277 A1 | 9/2009 | Gupta et al. |
| 2009/0310571 A1 | 12/2009 | Matischek et al. |

FOREIGN PATENT DOCUMENTS

| EP | 2077693 A1 | 7/2009 |
| WO | 2010088578 A2 | 8/2010 |

OTHER PUBLICATIONS

International Preliminary Report on Patentability Application No. PCT/EP2011/060149 Completed: Oct. 21, 2013 19 pages.

(Continued)

*Primary Examiner* — Chandrahas Patel
(74) *Attorney, Agent, or Firm* — Whitmyer IP Group LLC

(57) ABSTRACT

A wireless communication device for a wireless network employing a wireless time division communication structure, where the wireless communication device includes a wireless transmitter, a wireless receiver and an access control unit, which is configured to order the wireless transmitter to transmit, in a contention interval, a priority setting of a wireless communication device competing for resources, where the priority setting is transmitted as a signal having a frequency representing the priority setting, order the wireless receiver to receive, in the contention interval, priority settings of other competing wireless communication devices as signals having frequencies representing these priority settings, compare the transmitted priority setting with the received priority settings and seize a following data interval if the transmitted priority setting is higher than the received priority settings.

17 Claims, 3 Drawing Sheets

(56) References Cited

OTHER PUBLICATIONS

International Search Report & Written Opinion of the International Searching Authority Application No. PCT/EP2011/060149 Completed: Jan. 26, 2012; Mailing Date: Feb. 2, 2012 12 pages.
"Recent and Emerging Topics in Wireless Industrial Communications: A Selection", by Andreas Willig, IEEE Transactions on Industrial Informatics, vol. 4, No. 2, p. 102-124.
Written Opinion of the International Preliminary Examining Authority Application No. PCT/EP2011/060149 Mailing Date: Jul. 1, 2013 6 pages.

* cited by examiner

CONTENTION BASED ACCESS OF RESOURCES IN A WIRELESS NETWORK

FIELD OF THE INVENTION

The present invention generally relates to the accessing of resources by wireless communication devices in wireless networks. More particularly the present invention relates to a method for contention based accessing of resources by a wireless communication device, a wireless field device as well as a computer program product for such a wireless communication device.

BACKGROUND OF THE INVENTION

Wireless sensor networks are known to be used in process control systems. Examples on such networks are ZigBee and WirelessHart, ISA100, WIA-PA and Bluetooth. There also exist some WLAN based sensor networks.

These networks typically employ a time division communication scheme where a wireless communication device in the form of field device may access resources in the form of time intervals of the scheme for communication with the process control system.

Some wireless networks use a fixed allocation of the time interval to field devices. This requires a network manager or radio resource manager that manages the resources.

In order to speed up and also make the allocation of resources more flexible, it is of interest to use contention based access. In this case field devices compete for the resources and determine which field device is to occupy or seize a resource based on arbitration. However, this has been somewhat hard to implement in wireless systems because of the difficulties in implementing simultaneous transmission and reception.

There has been suggested some different schemes for providing contention based access in a wireless network, i.e. a field device accesses a time interval based on arbitration with competing field devices.

The article "Recent and Emerging Topics in Wireless Industrial Communications: A Selection", by Andreas Willig, IEEE Transactions on Industrial Informatics, Vol. 4, No. 2, page 102-124 mentions a number of approaches through which contention based access can be provided.

One approach mentioned is that all field devices transmit a jamming signal, where the length of the jamming signal indicates the priority. After having transmitted a jamming signal a field device switches to receiving and defers from transmitting if a jamming signal is then received and otherwise transmits data. In this way it is ensured that the field device having the highest priority will access the resource.

Another mentioned approach is to let the field devices listen on a channel for a time proportional to these priorities, where a high priority involves a short listening period. A field device then starts to transmit at the end of the interval if no other field device has already started to transmit.

Yet another approach mentioned is to have a bit-wise priority scheme through providing one time slot for each priority bit. The field devices will then transmit in the interval of the priority, where the highest priority is first. As soon as a field device with a lower priority receives a signal from a field device of higher priority, it gives up.

The latter scheme is also described in US 2009/0310571.

There is a problem with all these schemes and that is that there is a lot of time and effort needed for performing the arbitration. This time period is furthermore more or less dependent on the number of priority levels. This problem is therefore getting severe if there are many different priority levels.

There is therefore a need for an improvement in relation to contention based access of resources in a wireless network.

SUMMARY OF THE INVENTION

The present invention is directed towards providing an improved contention-based access of resources in a wireless communication network.

One object of the present invention is to provide an improved method for contention based accessing of resources by a wireless communication device in a wireless network.

This object is according to a first aspect of the present invention achieved through a method for contention based accessing of resources by a wireless communication device in a wireless network employing a wireless time division communication structure, the method comprising the steps of:
  transmitting, in a contention interval, a priority setting of a wireless communication device competing for a resource, said priority setting being transmitted as a signal having a frequency representing the priority setting,
  receiving, in the contention interval, priority settings of other competing wireless communication devices as signals having frequencies representing these priority settings,
  comparing the transmitted priority setting with the received priority settings, and
  seizing a following data interval if the transmitted priority setting is higher than the received priority settings.

Another object of the present invention is to provide a wireless communication device, which wireless communication device operates with an improved contention based accessing of resources in a wireless network.

This object is according to a second aspect of the present invention achieved through a wireless communication device for a wireless network employing a wireless time division communication structure, the wireless communication device comprising:
  a wireless transmitter,
  a wireless receiver, and
  an access control unit configured to:
    order the wireless transmitter to transmit, in a contention interval, a priority setting of a wireless communication device competing for resources, the priority setting being transmitted as a signal having a frequency representing the priority setting,
    order the wireless receiver to receive, in the contention interval, priority settings of other competing wireless communication devices as signals having frequencies representing these priority settings,
    compare the transmitted priority setting with the received priority settings, and
    seize a following data interval if the transmitted priority setting is higher than the received priority settings.

Another object of the present invention is to provide a computer program product for a wireless communication device, which computer program product provides the wireless communication device with an improved contention based accessing of resources in a wireless network.

This object is achieved by a computer program product for a wireless communication device of a wireless network employing a wireless time division communication structure, the computer program product comprising a data carrier with computer program code which when run on a processor forming an access control unit of the wireless communication device, causes the access control unit to:
- order a wireless transmitter to transmit, in a contention interval, a priority setting of a wireless communication device competing for resources, said priority setting being transmitted as a signal having a frequency representing the priority setting,
- order a wireless receiver to receive, in the contention interval, priority settings of other competing wireless communication devices as signals having frequencies representing these priority settings,
- compare the transmitted priority setting with the received priority settings, and
- seize a following data interval if the transmitted priority setting is higher than the received priority settings.

The present invention has a number of advantages. The invention allows low latency/delay and deterministic wireless communication with a combination of event driven and periodic communication. No scheduling of the wireless network is necessary, while at the same time determinism and real-time properties are retained. The invention thereby provides "bus" arbitration. This in turn allows a full utilization of bandwidth, since no retransmissions and routes have to be pre-scheduled. The invention also opens up for the use of several different priorities on the wireless network, which allows predictable event driven real-time communication.

BRIEF DESCRIPTION OF THE DRAWINGS

The present invention will in the following be described with reference being made to the accompanying drawings, where FIG. 1 schematically shows a control system for controlling a process using a wireless network, FIG. 2 schematically shows a superframe of a communication structure used in the wireless network, FIG. 3 schematically shows carrier waves providing different priorities in the wireless network.

DETAILED DESCRIPTION OF THE INVENTION

In the following, a detailed description of preferred embodiments of the invention will be given.

Figure 1:
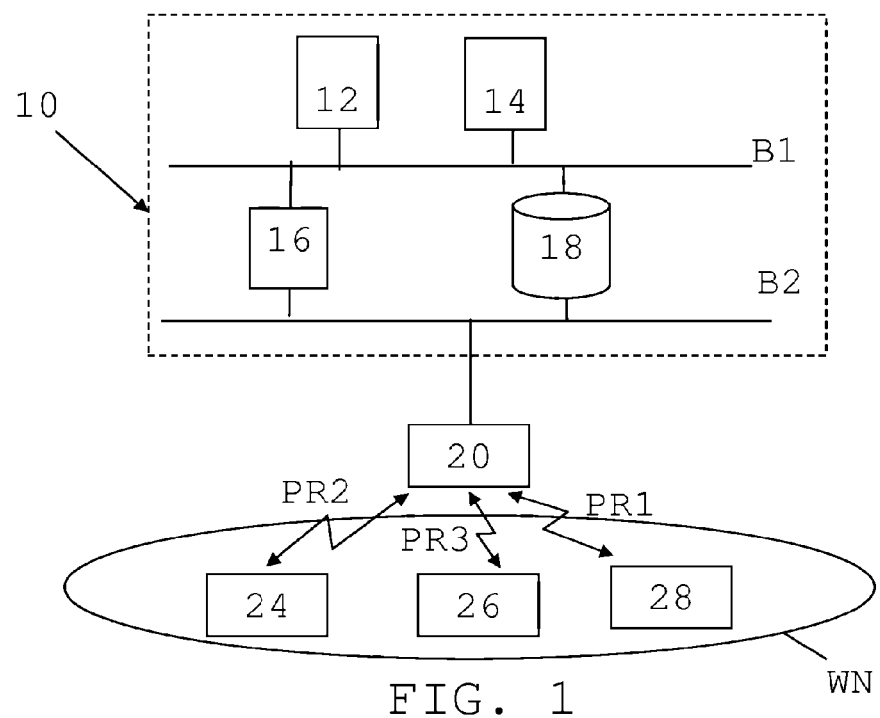

FIG. 1 schematically shows a control system 10 for a process, i.e. a process control system. The process may be an industrial process and may furthermore be any of a number of different types of processes such as a pulp and paper production process, an oil refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses there are connected a server 16 providing control and monitoring of the process and a database 18 where data, like historical data relating to control and monitoring of the process is stored. To the second bus B2 there is furthermore connected a gateway 20, which gateway is in turn connected to a wireless network WN. The wireless network WN may be an industrial network and may also be a wireless communication network. It may more particularly be a wireless sensor and actuator network (WSAN) and may thus be an industrial wireless sensor and actuator network. The wireless network may also use a time division communication scheme. In this wireless network WN there are shown three exemplifying wireless communication devices in the form of wireless field devices, a first field device 24, a second field device 26 and a third field device 28. The field devices are devices that are interfaces to the process and they communicate wirelessly with the gateway 20. The field devices 24, 26, 28 may typically be responsible for performing some type of control activity of the process, such as measuring a process parameter like a physical property of the process or providing a control activity in the process, such as actuating a valve, operating a pump, a switch etc. The actual control of the field devices is performed by the server 16. Communication in the wireless network is contention based. Because of this the field devices have different priority settings which they use to decide which of them has a right to communicate with the gateway 20. As an example the third field device 28 here has a first priority PR1, the first field device 24 has a second priority PR2 and the second field device 26 has a third priority PR3. In this example all field devices are furthermore communicating directly with the gateway 20 which in turn is another wireless communication device.

Figure 2:
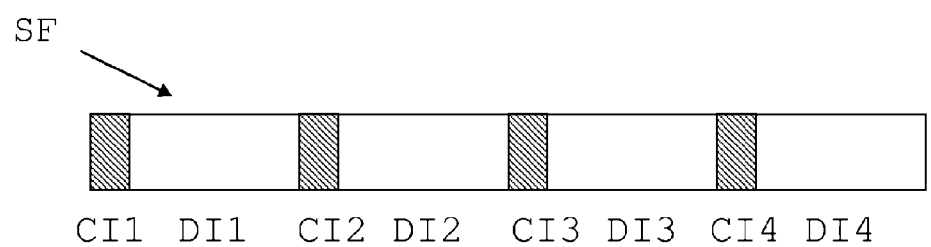

The field devices are communicating with the gateway 20 in a communication structure of the wireless network. One example of such a structure is schematically shown in FIG. 2. This structure is an uplink or upstream structure. The uplink structure comprises a superframe SF, which may comprise a number of data intervals DI1, DI2, DI3 and DI4, often also denoted time slots. Before each data interval there is furthermore a contention interval CI. All the intervals, the contention intervals and data intervals, are furthermore time intervals and may have fixed lengths. However, the contention interval is typically much shorter than the data interval. The exemplifying superframe SF thus here begins with a first contention interval CI1, after which follows a first data interval DI1. After the first data interval DI1 follows a second contention interval CI2, which in turn is followed by a second data interval DI2. After the second data interval DI2 follows a third contention interval CI3, which is followed by a third data interval DI3. Finally there is a fourth contention interval CI4 followed by a fourth data interval DI4. It can thus be seen that there are contention and data interval pairs following sequentially after each other. It can also be seen that directly after each contention interval there is a corresponding data interval. A data interval thus follows immediately after a corresponding contention interval. The number of time intervals is here only exemplifying and it should be realized that there may exist more and fewer contention and data interval pairs. The above described superframe SF is thus an uplink superframe. There may also exist a corresponding downlink or downstream structure, which is here omitted. Such a downlink superframe may not need to include contention intervals if all downlink communication is via the gateway, but may also be provided in the same way if more entities need to communicate in the downlink. In yet another variation there is no downlink or uplink superframe, but a single communication structure or a single frame with contention intervals and data intervals, which structure all transmitting entities or all wireless communication devices in the wireless network employ. This structure is thus used by the field devices and the gateway.

Figure 3:
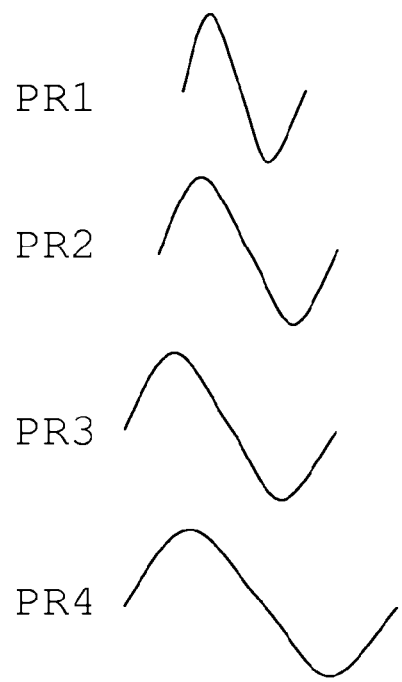

FIG. 3 schematically shows a period of a number of sinus waves of different frequencies for showing the principle of how priority is assigned according to the invention. A first priority PR1 having the shortest period and thus having a highest frequency is in this example a highest priority, a second priority PR2 having a longer period and thus having the second highest frequency is the second highest priority. A third priority PR3 having an even longer period and thus having the third highest frequency is the third highest priority. Finally a fourth priority PR4 having an even longer period and thus having the fourth highest frequency and thus having the fourth highest priority is shown. In this example a higher frequency thus provides a higher priority. It should be realized that as an alternative it is possible that the lowest frequency has the highest priority. Priorities may also be provided in other ways, where for instance a centre frequency in a frequency range would have the highest priority.

Figure 4:
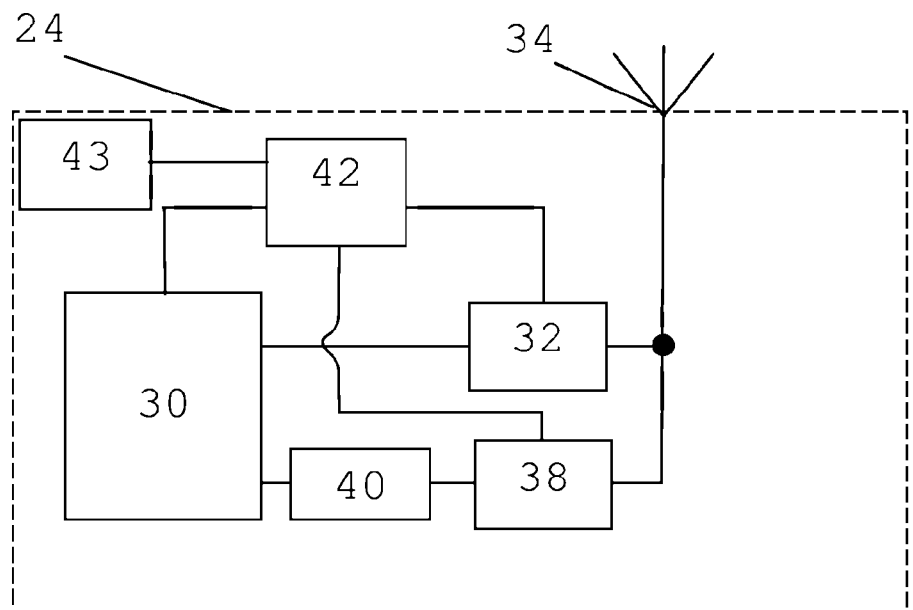
FIG. 4 shows a block schematic of a field device according to one embodiment of the invention for providing contention based access of resources, FIG. 5 schematically shows a number of method steps being performed by the field device in FIG. 4 for providing contention based access of resources, FIG. 6 schematically shows field devices in a wireless network where contention based access of resources is combined with hopping, and FIG. 7 schematically shows a data carrier carrying program code for implementing an access control unit of the field device in FIG. 4.

FIG. 4 shows a block schematic of units in the first field device 24 that are relevant for the present invention. The first field device 24 here comprises an access control unit 30, which is connected to a transmitter circuit 32 or wireless transmitter. The transmitter circuit 32 is in turn connected to an antenna 34, which is also connected to a receiver circuit 38 or wireless receiver, which in turn is connected to a transforming unit 40, which may be a Fourier transforming unit such as a Discrete Fourier Transformer (DFT) unit. The transforming unit 40 is also connected to the access control unit 30. Finally there is a modulation unit 42 which is connected to the access control unit 30, to a transmission buffer 43 as well as to the transmitter and receiver circuits 32 and 38. The transmitter and receiver circuits 32 and 38 here each comprise an oscillator and a radio circuit, where the oscillator may be controlled by the access control unit 30. It should here be realized that also the second and third field devices will have the same or similar structure. The structure mentioned above is a full duplex structure. However, it should here be realized that as an alternative it is possible with two antennas one for transmitting and one for receiving. As an alternative it is possible that the same units are provided in a gateway as well.

Figure 5:
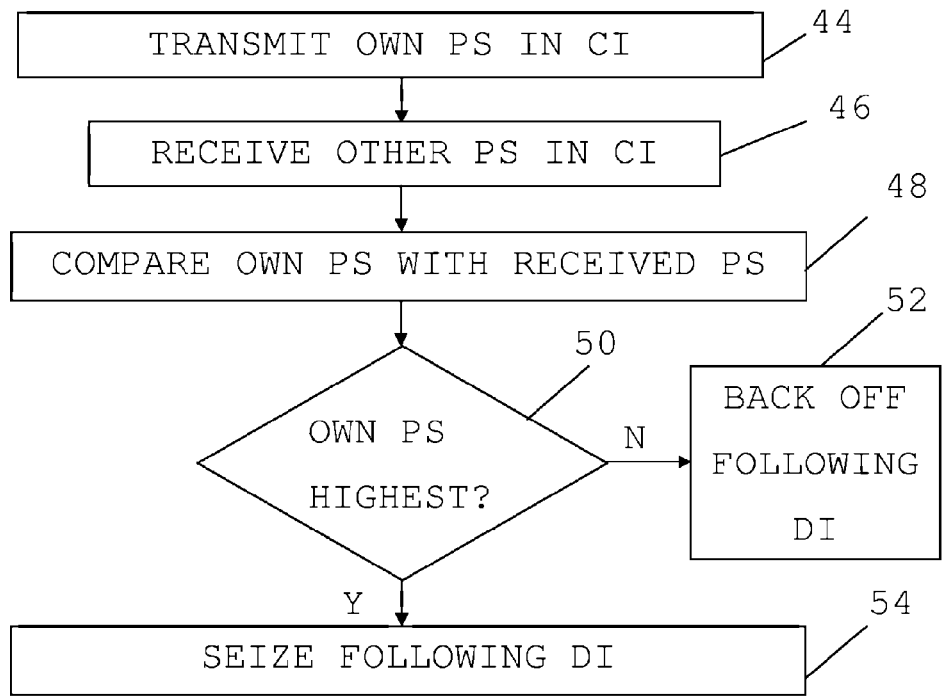

The functioning of the present invention according to a first embodiment will now be described with reference also being made to FIG. 5, which shows a flow chart of a number of method steps being performed in the first field device 24.

In the area of Industrial Wireless Sensor and Actuator Networks, a lot of different kind of data may need to be transmitted, ranging from process values and actuator set points to configuration and maintenance information. Industrial WSANs have a limited bandwidth today, compared to wired field buses, and using pre-defined communication schedules both increases delays as well as results in poor bandwidth utilization. The main reason for this is that a pre-defined communication schedule more or less has to account for the worst case scenario, taking into account bursts of events, configuration updates, etc., that due to limited bandwidth ends up in long delays that are undesirable or unacceptable in large scale industrial settings.

The field devices 24, 26, 28 are assigned different priorities and when they have data to be transmitted to the gateway 20 they will compete with each other in order to determine among themselves which has a right to the resources in the form of data intervals. A field device having data for transmission therefore waits until a contention time interval appears and then competes with other competing field devices having data for transmission. The one having the highest priority then gets the right to transmit in the following data interval. This determination is thus done through arbitration among the field devices. There is no higher instance assigning a data interval.

In this example the first field device 24 has the second priority PR2, the second field device 26 has the third priority PR3 and the third field device 28 has the first priority PR1. If now the first field device 24 wants to transmit data in a data interval, such as the first data interval DI1, the access control unit 30 orders the transmitter circuit 32 to transmit a priority setting of a field device competing for resources, which competing field device in this first embodiment is the first field device 24 itself. The access control unit 30 of the first field device 24 thus orders the transmitter circuit 32 to transmit an own priority setting PS in the contention interval, step 44, and here in the first contention interval CI1. This is done through controlling the oscillator of the transmitter circuit 32 to oscillate at a frequency corresponding to the priority setting. This in turn causes the radio circuit of the transmitter circuit 32 to transmit a carrier wave having the frequency of the own priority setting. In the example given here the transmitter will thus transmit a carrier wave having the frequency of the second priority PR2 for the first field device 24.

At the same time the access control unit 30 orders the receiver circuit 38 to receive other priority settings in the contention interval, step 46, i.e. priority settings of other competing field devices. It may do this through making the oscillator of the receiver circuit 38 scan a frequency range within which priority frequencies may appear and any signals received in this range may then be received by the receiver circuit 38. If the second and third field devices 26 and 28 have data they want to transmit, they will therefore in the same way transmit carrier waves representing their priority settings. The second field device 26 would therefore transmit a carrier with a frequency representing the third priority PR3, while the third field device 28 would transmit a carrier with a frequency representing the first priority PR1. It is possible that the priorities are provided at discrete frequencies. In this case the access control unit 40 may make the oscillator tune the receiver 38 to these discrete frequencies.

The received frequencies are time domain signals and are also forwarded to the transforming unit 40, which transforms the time domain signals into frequency domain signals. These frequency domain signals are then provided to the access control unit 30. Here it is possible that the access control unit 30 already has access to a frequency domain version of the own priority setting and may therefore not need to transform this frequency.

Thereafter the access control unit 30 compares the own priority setting with the received priority settings, step 48, i.e., it compares the transmitted priority setting with the received priority settings from other competing field devices. If the own priority setting is highest, step 50, then the access control unit 30 seizes the following data interval, step 54. This may be done through instructing the modulator 42 to modulate data in the buffer 43 on a carrier used in the data intervals of the communication structure, which data is then transmitted via the transmitter circuit 38 and transmitting antenna 34. In the present example, this thus means that if the first field device with the priority setting PR2 had the highest priority in the first contention interval CI1, then the first data interval DI1 would be seized by the first field device 24, which is the case if the first field device 24 competed with the second field device 26, which has the priority setting PR3.

If however the own priority setting was lower than the priority setting of any of the other competing field devices, then the first field device 24 backs off, step 52, which may be done through inhibiting the modulator 42 from modulating any data in the transmission buffer 43 and stopping the transmitter circuit 32 from transmitting. This would be the case if the first field device 24 were competing with the third field device 28, which has the highest priority setting PR1.

The above described operation is then sequentially repeated for determining which field device is to be allowed to transmit in the second, third and fourth data intervals DI2, DI3 and DI4 and is furthermore continued for every superframe SF.

In this way all the field device may perform arbitration for accessing the data intervals. It can here be seen that since different frequencies are used it is possible to have several priority levels without increasing the time required for the arbitration. Furthermore since different frequencies are used it is also possible for a field device to transmit and receive at the same time. The size of the contention interval may therefore only be limited by the ability of the field devices to scan the frequencies. However, also this limitation may in fact also not need to be a problem through using several parallel receiving circuits.

In the first embodiment of the invention all field devices were communicating directly with the gateway. However, it is possible to employ hop and multi-hop technique. In this case a field device acting as a relay will use the priority setting of the field device having data for transmission. This is exemplified in FIG. 6, which shows the wireless network WN with the first, second and third field devices 24, 26 and 28 communicating with the gateway 20. Here the field devices have the same priority settings as in the first embodiment. The difference is that the first field device 24 is acting as a relay node for the second field device 26. This means that the second field device 26 communicates with the gateway 20 via the first field device 24. Therefore the first field device 24 employs the priority setting of the second field device 26, here the third priority PR3, when acting as a relay for this second field device 26. It thus transmits the priority setting of the second field device 26 when competing for resources and when determining if to seize a data interval or to back off.

The main problem solved by this invention is low latency/delay and deterministic wireless communication with a combination of event driven and periodic communication. This is solved by using a Wireless Media Access Arbitration scheme instead of other schemes such as a classical Collision Avoidance or Collision Detection mechanisms. In this way, packets can be prioritized on the wireless media, allowing full bandwidth utilization, deterministic and fair real-time properties, while enabling both event driven and periodic communication.

Figure 6:
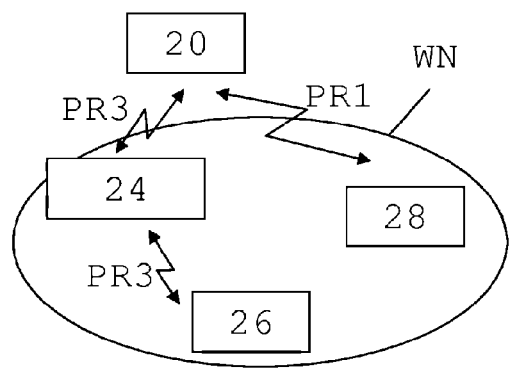

The invention has several further advantages. No scheduling of networks is necessary, while at the same time determinism and real-time properties are retained. The invention thus provides "bus" arbitration before every data interval instead of pre-scheduled data intervals. This in turn allows a full utilization of bandwidth, since no retransmissions and routes have to be pre-scheduled. Furthermore all field devices may have different priorities on the wireless network, which allows predictable event driven real-time communication. The system is fair in case of overload due to message prioritization, since low priority messages will miss their deadlines. The invention also enables event driven communication without reserving bandwidth. There is also a low latency since nodes, for instance field devices, do not have to wait for a scheduled slot. As can be seen in FIG. 6 the invention also works even in mesh and multi-hop networks.

Figure 7:
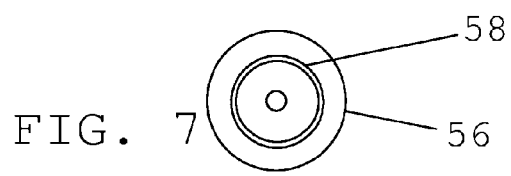

The access control unit may be realized in the form of a discrete component, such as an Application Specific Integrated Circuit (ASIC) or Field-Programmable Gate Array (FPGA) circuit, which may also comprise the other units and circuits of the first field device. However, the access control unit may also be realized through a processor with an associated program memory including computer program code for performing the functionality of the access control unit when being run on the processor. This computer program product can be provided as a data carrier such as one or more CD ROM discs or one or more memory sticks carrying computer program code, which provides the above-described access control unit when being run by said processor. One such data carrier 56 in the form of a CD ROM disk with a computer program 58 carrying such computer program code is schematically shown in FIG. 7.

From the foregoing discussion it is evident that the present invention can be varied in a multitude of ways. As mentioned above one variation is a single recurring structure used by all devices communicating wirelessly. This means that the gateway and the field devices may all be wireless communication devices competing for the network resources in the single recurring communication structure, which may be a recurring frame structure. It shall consequently be realized that the present invention is only to be limited by the following claims.

What is claimed is:

1. A method for contention based accessing of resources by a wireless communication device in an industrial wireless sensor and actuator network employing a wireless time division communication structure, the method being performed by the wireless communication device having data for transmission and comprising the steps of:

assigning a different frequency to each of the wireless communication device and other competing wireless communication devices, each frequency representing a priority setting, transmitting, in a contention interval, the priority setting of the wireless communication device competing for a resource, said priority setting being transmitted as a carrier wave having a previously-assigned frequency representing the priority setting, receiving, in the contention interval, priority settings of the other competing wireless communication devices having data for transmission, said priority settings being received as carrier waves having previously-assigned frequencies representing these priority settings, comparing the transmitted priority setting with the received priority settings, and seizing a following data interval if the transmitted priority setting is higher than the received priority settings for transmitting data in the following data interval, the data interval having a fixed length.

2. The method according to claim 1, further comprising backing off from the following data interval if any received priority setting is higher than the transmitted priority setting.

3. The method according to claim 1, wherein a high frequency denotes a high priority.

4. The method according to claim 1, wherein the steps of transmitting and receiving are performed simultaneously.

5. The method according to claim 1, further comprising transforming the received signals to the frequency domain and performing the comparison in the frequency domain.

6. The method according to claim 1, wherein the transmitted priority setting is an own priority setting.

7. The method according to claim 1, wherein the transmitted priority setting is the priority setting of another wireless communication device.

8. The method according to claim 1, wherein the network uses a communication structure comprising contention and data interval pairs, wherein each pair follows immediately after another.

9. The method according to claim 1, wherein the data interval is immediately following the contention interval.

10. A wireless communication device for an industrial wireless sensor and actuator network employing a wireless time division communication structure, where the wireless communication device has data to be transmitted and comprises:
   a wireless transmitter,
   a wireless receiver, and
   an access control unit configured to:
      assign a different frequency to each of the wireless communication device and other competing wireless communication devices, each frequency representing a priority setting,
      order the wireless transmitter to transmit, in a contention interval, the priority setting of the wireless communication device competing for resources, said priority setting being transmitted as a carrier wave having a previously-assigned frequency representing the priority setting,
      order the wireless receiver to receive, in the contention interval, priority settings of the other competing wireless communication devices having data for transmission, said priority settings being received as carrier waves having previously-assigned frequencies representing these priority settings,
      compare the transmitted priority setting with the received priority settings, and
      seize a following data interval if the transmitted priority setting is higher than the received priority settings for transmitting data in the following data interval, the data interval having a fixed length.

11. The wireless communication device according to claim 10, wherein the access control unit is configured to simultaneously order the wireless transmitter to transmit the priority setting and order the receiver to receive priority settings of the other competing wireless communication devices.

12. The wireless communication device according to claim 10, further comprising a transforming unit configured to transform the received signals with priority settings to the frequency domain and supply to the access control unit for allowing the comparison to be performed in the frequency domain.

13. The wireless communication device according to claim 10, wherein the transmitted priority setting is an own priority setting.

14. The wireless communication device according to claim 10, wherein the transmitted priority setting is the priority setting of another wireless communication device.

15. The wireless communication device according to claim 10, wherein the access control unit is configured to back off from the following data interval if any received priority setting is higher than the transmitted priority setting.

16. The wireless communication device according to claim 10, wherein a high frequency denotes a high priority.

17. A computer program product for a wireless communication device of an industrial wireless sensor and actuator network employing a wireless time division communication structure, where the wireless communication device has data to be transmitted and comprises a wireless transmitter and a wireless receiver,
   the computer program product comprising a non-transitory data carrier with computer program code which when run on a processor forming an access control unit of the wireless communication device, causes the access control unit to:
   assign a different frequency to each of the wireless communication device and other competing wireless communication devices, each frequency representing a priority setting,
   order the wireless transmitter to transmit, in a contention interval, the priority setting of the wireless communication device competing for resources, said priority setting being transmitted as a carrier wave having a previously-assigned frequency representing the priority setting,
   order the wireless receiver to receive, in the contention interval, priority settings of the other competing wireless communication devices having data for transmission, said priority settings being received as carrier waves having previously-assigned frequencies representing these priority settings,
   compare the transmitted priority setting with the received priority settings, and
   seize a following data interval if the transmitted priority setting is higher than the received priority settings for transmitting data in the following data interval, the data interval having a fixed length.

* * * * *